United States Patent [19]

Whelan, Jr.

[11] 3,951,894

[45] Apr. 20, 1976

[54] TERNARY FLAME-RETARDED COMPOSITIONS INCLUDING IRON COMPOUND

[75] Inventor: William Paul Whelan, Jr., Woodbury, Conn.

[73] Assignee: Uniroyal Inc., New York, N.Y.

[22] Filed: Oct. 17, 1974

[21] Appl. No.: 515,800

[52] U.S. Cl.......................... 260/27 BB; 260/42.13; 260/42.22; 260/42.24; 260/42.48; 260/45.75 P; 260/880 R
[51] Int. Cl.² ............................................ C08J 3/20
[58] Field of Search ............... 260/45.75 P, 27 BB, 260/42.22, 42.24, 42.48, 42.13, 880 R; 106/15 FP

[56] References Cited
UNITED STATES PATENTS

| | | | |
|---|---|---|---|
| 2,563,772 | 8/1951 | Cheney | 260/45.75 |
| 3,202,567 | 8/1965 | Muri et al. | 260/45.75 |
| 3,282,882 | 11/1966 | Vuillemenot et al. | 260/45.95 |
| 3,442,980 | 5/1969 | Grabowski | 260/45.75 |
| 3,721,634 | 3/1973 | Versnel | 260/45.75 |
| 3,821,151 | 6/1974 | Mitchell | 260/45.75 |

*Primary Examiner*—V. P. Hoke
*Attorney, Agent, or Firm*—Willard R. Sprowls

[57] ABSTRACT

New flame-retarded rubber and plastic compositions are disclosed which are economical to produce and which exhibit increased flame-retardance and reduced toxicity. Generally, these new compositions comprise a copolymer of acrylonitrile-butadiene rubber or a terpolymer of acrylonitrile, butadiene and styrene, a bromine- or chlorine-containing organic fire-retardant additive, and an iron compound selected from a specified group.

24 Claims, No Drawings

TERNARY FLAME-RETARDED COMPOSITIONS INCLUDING IRON COMPOUND

THE INVENTION

This invention relates to new flame-retarded rubber or plastic compositions obtained from a copolymer of acrylonitrile and butadiene or a terpolymer of acrylonitrile, butadiene, and styrene; an organic fire-retardant additive containing chlorine and/or bromine; and an iron compound selected from a specified group. These new compositions exhibit increased flame-retardancy and reduced toxicity, and are economical to produce.

BACKGROUND OF THE INVENTION

A variety of applications for rubber and plastic compositions based on acrylonitrile-butadiene copolymers and ternary polymers require substantial reduction in the inherent flammability of the compositions. The use of organic compounds of chlorine or bromine as additives for this purpose is known (1). While these additives are effective, the amounts required to impart the desired degree of flame retardancy are frequently great enough to result in substantial detriment to other important properties of the compositions, e.g., mechanical strength (such as tensile and impact strength), modulus, deflection temperature and the like.

(1) J. W. Lyons, The Chemistry and Uses of Fire Retardants (Wiley—Interscience, 1970), pp. 328–332.

The use of antimony trioxide as a synergistic additive to reduce the amount of halogen compound required in these compositions is also known (2). However, antimony trioxide is costly and its recent history of limited availability and price instability has shown the hazard of reliance on a single material for this purpose. In the case of acrylonitrile-butadiene-styrene (ABS) compositions, antimony trioxide also produces undesirable side-effects on mechanical properties such as impact strength.

(2) Ibid.

Alternatives to the use of antimony trioxide have been reported to be applicable to nitrile rubber compositions. Thus, rubber compositions comprising either a natural rubber or a synthetic rubber, such as styrene-butadiene rubber (SBR), a reinforcing black, and a fire-retardant system consisting of a chlorine compound plus calcium borate, zinc borate and iron oxide have been disclosed in Belg. Pat. No. 766,567.

Metallic compounds which have been disclosed as fire-retardant additives for ABS include stannic oxide hydrate (3) and compounds of fluorine (U.S. Pat. No. 3,634,311). Weakly effective hydrated metallic compounds, such as hydrated alumina and zinc borate, are also known (4). Chromium carboxylates have also been disclosed (U.S. Pat. No. 3,729,436) in ABS/-polyvinyl chloride blends of approximately 50/50 composition.

(3) J. Fire & Flammability 3, 130 (1972).
(4) Modern Plastics Encyclopedia 50 (10A) 236, 718 (1973–74).

Styrene polymers closely related to ABS have been flame-retarded (Belg. Pat. No. 643,139; Belg. Pat. No. 621,125; Ger. Pat. No. 1,282,937; Ger. Pat. No. 1,282,938) with combinations of chlorine compounds (or chlorine compounds and bromine compounds) and various metallocenes, metal carbonyls, metal dye complexes, or the like. However, these metallic additives are costly and present disadvantages such as volatility, instability or toxicity. Ferrocene, for example, which is most completely described (in the immediately preceding four patent references) in this usage, is far more costly than antimony trioxide and is volatile at elevated temperatures. Thus, it is an undesirable additive for polymers such as ABS which are processed at high temperatures. Other flame retardant systems for styrene polymers have included metal carboxylates, such as iron naphthenate, in combination with an organic chlorine compound or in combination with both an organic halogen compound and a synergistic hydrocarbon (U.S. Pat. No. 3,595,815; Fr. Pat. No. 1,520,880). The nature of these systems imposes serious limitations on the balance of cost flammability and other desirable properties obtainable. Likewise, the alternative utilization of lead compounds in these and other systems also poses toxicity hazards.

The use of metal chelates (including ferric acetylacetonate) has also been described (Brit. Pat. No. 1,047,482) in polymers containing at least 50 mole percent of styrene, but these polymers are generally unsuitable for ABS applications.

It is also known (Ger. Pat. No. 1,169,122) that iron halides, such as ferric chloride, can serve as flame retardant additives. However, the sensitivity of these materials to atmospheric moisture seriously limits their utility in polymers.

U.S. Pat. No. 3,766,157 deals with smoke-retardant polymer compositions comprising a styrene polymer and sufficient iron 8-hydroxyquinolate to reduce smoking. The use of this iron compound does not form part of the present invention.

U.S. Pat. No. 3,697,456 teaches the combination of a halogenated organic compound and ferric oxide or other oxides for flame retarding polyurethane foam. These metal oxides are partial, rather than total, replacements for antimony trioxide in polyurethane foam. This is brought out at col. 5, lines 30–33: "Thus surprisingly while the metal oxides used according to the invention are highly effective partial replacements for $Sb_2O_3$, they are not effective when used as total replacements."

THE INVENTION

It has now been found that copolymers and certain terpolymers of butadiene and acrylonitrile, when combined with (a) an organic fire-retardant additive containing chlorine and/or bromine and (b) an iron compound selected from a specified group, provide highly useful, flame-retarded rubber or plastic compositions offering significant advantages over previously known compositions such as those described above. The iron compounds, which exert little flame retardant effect in the polymers in the absence of a halogen compound, are powerful synergists for the halogen compounds in these polymers. Further, this combination permits broad latitude in the selection of compounds for specific properties and end uses due to the availability of the wide variety of halogen and iron additives useful in this invention.

When the polymer is a nitrile-butadiene rubber (NBR), its combination with a suitable halogen-containing additive and a suitable iron compound in conjunction with conventional ingredients provides solid or sponged compositions, which are highly useful in such applications as flame-resistant hose, conveyor belts, insulation materials and the like. No additional fire retardant additives, such as costly antimony trioxide, are necessary. The compositions may also be formulated, with or without the inclusion of other fire-retardant additives, so as to be self-extinguishing and non-dripping, even in vertical burning tests at specimen thickness as low as one-sixteenth inch.

When the polymer is a conventional ABS resin, for another example, these combinations provide highly flame-retarded, impact resistant plastic compositions without the use of costly antimony, chromium or tin additives or toxic fluorine compounds. By Oxygen Index and burning rate criteria, the compositions are far more effectively flame-retarded than analogous compositions containing a wide variety of other metallic compounds.

Utilization of the iron compounds of the invention in particular permits new advantages in cost, raw material availability and low toxicity. Further, while the alternative utilization of antimony trioxide is often disadvantageous to the mechanical properties of the compositions, the high flame-retardant activity obtainable with low concentrations of the iron compounds assures minimal disadvantage to these properties.

The polymers useful in this invention include acrylonitrile-butadiene rubbers (NBR), ABS polymers (mixtures of an NBR or of a graft terpolymer of acrylonitrile, butadiene and styrene with a styrene-acrylonitrile resin) and blends of NBR with ABS or of the aforementioned graft terpolymer. Suitable ABS polymers are disclosed in U.S. Pat. No. 3,686,362, col. 1, line 50—col. 3, line 21 and in U.S. Pat. No. 3,809,725, col. 3, lines 15–30. Also operative in this invention are ABS graft copolymers on an EP or EPDM spine, as disclosed in U.S. Pat. No. 3,809,725, col. 3, lines 39–48. The foregoing two patents are hereby incorporated herein by reference. The NBR rubbers are suitably emulsion copolymers of acrylonitrile with butadiene, wherein all or part of the butadiene may be replaced by isoprene and all or part of the acrylonitrile may be replaced by such monomers as methacrylonitrile, alpha-chloracrylonitrile, alpha-bromacrylonitrile and ethacrylonitrile.

The organic, halogen-containing fire retardant additives utilized in the invention are well known (5), being of the class of widely recognized fire-retardant additives for polymers and including chlorine and/or bromine-containing compounds of aliphatic, aromatic, alicyclic of mixed types having a halogen content typically in the range of 35–80% by weight. Substituents other than halogen, such as hydroxyl, anhydride, ether, carboxyl, ester and phosphate, may also be present provided they do not interfere with the fire-retardant activity of the compound when coupled with the iron compound or otherwise destroy the advantageous properties of the composition. The halogen compounds selected should be substantially non-volatile, stable and non-reactive toward the polymer and any auxiliary ingredients, e.g., rubber curatives, at polymer processing temperatures. Alternatively, inadequately stable halogen compounds may be stabilized with additives, such as commercially available organotin stabilizers for polyvinyl chloride, so that they are stable at polymer processing temperatures. The halogen compound may optionally be polymeric such as, for example, a polyvinyl halide, neoprene, or chlorinated polyethylene. Mixtures of halogen compounds may also be employed.

(5) C. J. Hilado, *Flammability Handbook for Plastics* (Technomic, 1969) and J. W. Lyons, op. cit.

Examples of non-polymeric chlorine and bromine compounds useful in the practice of this invention include chlorinated paraffins, marketed under a variety of trademarks such as "Chlorowax", "Unichlor" and "Cereclor", tetrabromoethane, hexabromobutane-2, tribromoneopentyl alcohol, dibromoneopentyl glycol, dibromobutenediol and its diacetate, methyl pentachlorostearate, and tris (mono- and d-haloalkyl)phosphates, halogenated aromatics such as hexa-, octa-, and decabromobiphenyls, decabromodiphenyl oxide, hexabromobenzene, tribromophenol, tetrabromosalicylanilide, tetra(pentabromophenoxy) silane, dibromopropyl chlorobenzoate, dibromopropyl maleate, tetrachloro- and tetrabromophthalic anhydrides, tetrachloro- and tetrabromobisphenol A and their bis-hydroxypropyl derivatives, halogenated cycloaliphatics, such as hexabromocyclododecane, pentabromochlorocyclohexane, bis(cyclohexenyl)ethylene hexabromide, hexachlorocyclopentadiene (HCCPD) and its derivatives (typically Diels-Alder adducts with normal or cyclic dienes or olefins and including, for example, chlorendic acid, chlorendic anhydride, dimethyl chlorendate, diallyl chlorendate, "Cloran", perchloropentacyclodecane, and HCCPD adducts with furan, benzoquinone, vinylnorbornene, cyclooctadiene, pentadiene and the like).

The amount of halogen compound to be employed will vary with the specific compound and will be determined by the degree of flame retardation desired and the tolerable limits for other properties. In general, at least 1 part of halogen compound per 100 parts of polymer by weight will be required for useful flame retardancy. Typically, the amount of halogen compound employed will be in the range of 5–40 parts by weight per 100 parts of polymer. Where property requirements permit, however, larger amounts of halogen compound may be employed since the synergistic effect of the iron compounds used in combination with the halogen compound persists to far higher levels of halogen compound. For example, such is the case where the halogen compound is polyvinyl chloride, which may be usefully employed in amounts as high as 300 parts per 100 parts of nitrile polymer. Nevertheless, it is a specific advantage of this invention that the amount of halogen compound required for a given degree of flame retardancy is greatly reduced by its combination with the iron compound.

Iron compounds which may be employed include iron metal, ferrous and ferric sulfates, ferrous and ferric ammonium sulfates, iron carbonate, ferrous sulfide, ferrous, ferric, ferrous ammonium and ferric ammonium salts of carboxylic acids, such as acetic, stearic, oxalic and citric acids, and iron resinate. Both basic and normal forms of the salts are operable, as well as both anhydrous and hydrated forms. Mixtures of the iron compounds may also be employed. In suitable cases, mixtures with other metallic compounds, such as antimony trioxide, may also be employed. These iron compounds are remarkable both in providing higher levels of flame retardancy, such as measured by the Oxygen Index criterion, than those previously obtainable with compounds of other metals and in providing these benefits at low concentrations.

The amount of iron compound to be employed will, as in the case of the halogen compound, depend on the desired balance between flame-retardancy and other properties, as well as on the specific compound chosen. In general, at least about 0.1 part of iron compound per 100 parts of polymer by weight will be required for significant flame retardancy beyond that conferred by the halogen compound while amounts over 50 parts of iron compound per 100 parts polymer offer little advantage. One to 25 parts of iron compound per 100 parts of polymer is preferred, and 1 to 10 parts is most preferred.

The rubber and plastic compositions of this invention are readily obtained by conventional rubber and plastics compounding techniques, and are converted to finished products by processes well known to the art. It is also clear that any amount of polymer smaller than that desired for the final composition may be combined with the iron and halogen compounds by suitable techniques, the resulting concentrate (or masterbatch) being combined subsequently with additional polymer in the conventional manner. Such a procedure can be useful in facilitating dispersion of the fire-retardant components in the final composition. With reference to the concentrate, it is, of course, also possible to substitute for the polymer, in whole or in part, such other polymers as will be suitable to the processing and properties of the final composition and will not prevent operation of the fire-retardant system. Processing aids and/or other ingredients which meet the same requirements may be included in the concentrate in addition.

The invention and the preparation of flame-retarded rubber or plastic compositions will become more clear from the examples below which are set forth as being illustrative of the invention and are not intended to be, nor should they be construed as being, limitative thereof. In the examples, compounding of ABS test specimens was carried out in a conventional manner on a rubber/plastics mill. Slab specimens were compression molded, and were cut to size and finished as appropriate to the test method. The ABS polymer employed was a 50/50 weight percent graft terpolymer-resin blend containing 22% acrylonitrile, 23% butadiene and 55% styrene. The graft terpolymer was a 90/10 butadiene/styrene emulsion copolymer rubber onto which had been graft polymerized a 70/30 weight percent mixture of styrene and acrylonitrile. The resinous component was a conventional emulsion polymerized 70/30 weight percent styrene/acrylonitrile copolymer. The above-named halogen compounds are among those utilized in the Examples:

"Cloran": 1,2,3,4,9,9-hexachloro-1,4,4a,5,-6,7,8,8a-octahydro-1,4-methanonaphthalene-6,7-dicarboxylic anhydride.

"Halo-I": 6-(1',4',5',6',7',7'-hexachloronorborn-5'-en-2'-yl)-1,2,3,4,10,10-hexachloro-1,4,4a,5,6,7,8,8a-octahydro-1,4:5,8-dimethanonaphthalene.

Polyvinyl chloride: Marvinol 23, a general purpose resin of medium molecular weight, having an intrinsic viscosity (ASTM D-1243-66) = 0.93, a specific gravity of 1.40 and an oil absorption, cc./gm. (ASTM D-281) of 0.9.

Testing of the specimens was carried out as follows:

1. Oxygen Index: ASTM Method D-2863, "Flammability of Plastics Using the Oxygen Method". Oxygen Index is the minimum concentration of oxygen, expressed as percent by volume, in a slowly rising mixture of nitrogen and oxygen, that will just support the combustion of a material burning under equilibrium conditions of candle-like burning. Higher Oxygen Index indicates decreased relative flammability. Since the method provides a continuous numerical scale for the assignment of relative flammability ratings, it is especially appropriate for illustrating differences in the degree of flame retardation provided by additives and additive combinations. "ΔOI" in all Examples represents the increase in the Oxygen Index provided by the additive or combination over that of the base polymer.

2. Horizontal Burning Rate and Vertical Burning Test performance were determined in substantial accordance with the procedures below, with indicated departures as to number of specimens tested and elimination of preconditioning as appropriate:

a. Horizontal: ASTM D-635-63, "Test for Flammability of Rigid Plastics." Three or more specimens of the dimensions indicated were employed per test. Compositions which failed to burn to the 4-inch mark are designated in the Examples as "SE" (self-extinguishing), while compositions which failed to burn to the 1-inch mark are designated "NB" (non-burning).

b. Vertical: UL Subject 94 Vertical Burning Test for Classifying Materials 94 V-0, 94-V-1, or 94 V-2. Five 5 inches × ½ inch slab specimens, in the thickness indicated, of each composition were tested in "as prepared" condition.

EXAMPLE 1

This Example illustrates the powerful flame retardant effect provided by combinations of an iron compound with a halogen compound in a suitable polymer, as shown in (h)–(o), in contrast to the weak effect of the iron compound or halogen compound alone, as shown in (a)–(g).

| | | Polymer: ABS resin | | | |
|---|---|---|---|---|---|
| Halogen Compound | pph | Iron Compound | pph | Oxygen Index | ΔOI |
| (a) None | — | None | — | 18.5 | — |
| (b) None | — | Ferric Sulfate (hydrate) | 5 | 19.6 | +1.1 |
| (c) None | — | Ferrous Sulfate (anhydrous) | 5 | 18.9 | +0.4 |
| (d) Polyvinyl Chloride* | 20 | None | — | 21.7 | +3.2 |
| (e) "Cloran" | 30 | None | — | 20.9 | +2.4 |
| (f) Hexabromocyclododecane | 15 | None | — | 22.6 | +4.1 |
| (g) Tetrabromobisphenol A | 19.3 | None | — | 22.2 | +3.7 |
| (h) Polyvinyl Chloride* | 20 | Ferric Sulfate | 3 | 30.4 | +11.9 |
| (i) Polyvinyl Chloride* | 20 | Ferrous Sulfate | 4 | 29.8 | +11.3 |
| (j) "Cloran" | 30 | Ferric | 3 | 27.2 | +8.7 |

-continued

| Halogen Compound | pph | Polymer: ABS resin Iron Compound | pph | Oxygen Index | ΔOI |
|---|---|---|---|---|---|
| (k) "Cloran" | 30 | Sulfate Ferrous Sulfate | 1 | 25.3 | + 6.8 |
| (l) Hexabromo-cyclododecane | 15 | Ferric Sulfate | 1 | 28.4 | + 9.9 |
| (m) Tetrabromo-bisphenol A | 19.3 | Ferric Sulfate | 6 | 32.0 | +13.5 |
| (n) Tetrabromo-bisphenol A | 19.3 | Ferrous Sulfide | 6.2 | 26.1 | + 7.6 |
| (o) Tetrabromo-bisphenol A | 19.3 | Ferrous Citrate | 3.7 | 28.8 | +10.3 |

*Stabilized with Thermolite 31, an organotin mercaptide stabilizer for polyvinyl chloride marketed by M & T Chemicals, Inc.

In Example 1 and in the following Examples, ferric sulfate is used as the hydrate, while ferrous sulfate is used in the anhydrous form unless otherwise designated.

EXAMPLE 2

This Example demonstrates the operability of a wide variety of additional iron compounds in combination with a halogen compound in ABS resin and includes test data for antimony trioxide to illustrate the higher effectiveness of the iron compounds.

| Halogen Compound: Polyvinyl chloride*, 20 pph | | | |
|---|---|---|---|
| Iron Compound | pph | Oxygen Index | ΔOI |
| (a) None | — | 21.7 | + 3.2 |
| (b) Iron Metal | 3 | 29.3 | +10.8 |
| (c) Basic Ferric Sulfate (dry) | 4.5 | 31.2 | +12.7 |
| (d) Hydrated Ferrous Sulfate | 3.7 | 30.0 | +11.5 |
| (e) Ferrous Oxalate | 4 | 30.7 | +12.2 |
| (f) Ferric Ammonium Sulfate | 6 | 29.3 | +10.8 |
| (g) Ferrous Ammonium Sulfate | 6 | 25.4 | + 6.9 |
| (h) Ferrous Stearate | 8.2 | 31.9 | +13.4 |
| (i) Basic Ferric Acetate | 2.5 | 32.2 | +13.7 |
| (j) Ferrous Carbonate | 2 | 31.2 | +12.7 |
| (k) Ferric Oxalate | 3 | 25.7 | + 7.2 |
| (l) Ferric Ammonium Oxalate | 6 | 27.0 | + 8.5 |
| (m) Ferric Ammonium Citrate | 4.2 | 27.5 | + 9.0 |
| (n) Antimony Trioxide | 1 | 22.6 | + 4.1 |
| (o) Antimony Trioxide | 5 | 25.1 | + 6.6 |
| (p) Antimony Trioxide | 10 | 30.3 | +11.8 |

*Stabilized with Thermolite 31.

In the same polymer in the absence of iron compounds, an oxygen index of 27.7 (ΔOI = +9.2) was obtained with 100 pph of the polyvinyl chloride, illustrating that the iron compounds greatly reduce the required amount of halogen compound.

EXAMPLE 3

This Example further illustrates the effectiveness of the iron compounds in combination with a cycloaliphatic chlorine compound in ABS.

| Halogen Compound: "Cloran", 30 pph. | | | |
|---|---|---|---|
| Iron Compound | pph | Oxygen Index | ΔOI |
| Ferrous Carbonate | 2 | 26.7 | + 8.2 |
| Ferrous Stearate | 8 | 29.3 | +10.8 |
| Ferrous Oxalate | 4 | 27.1 | + 8.6 |
| Ferric Ammonium Sulfate | 6 | 26.8 | + 8.3 |
| Ferric Ammonium Oxalate | 6 | 25.0 | + 6.5 |
| Ferric Ammonium Citrate | 8.4 | 26.6 | + 8.1 |
| Basic Ferric Acetate | 2.5 | 27.7 | + 9.2 |

-continued

| Halogen Compound: "Cloran", 30 pph. | | | |
|---|---|---|---|
| Iron Compound | pph | Oxygen Index | ΔOI |
| None | — | 20.9 | + 2.4 |

EXAMPLE 4

This Example demonstrates the high effectiveness of an iron compound in combination with a halogen compound in flame-retarding NBR rubber compositions in comparison to the effect of the halogen compound either alone or in combination with antimony trioxide. Rubber A is an acrylonitrile:butadiene copolymer rubber having 32.5% by weight of acrylonitrile. Dechlorane 602, a commercial fire retardant, is a cycloaliphatic chloride containing 69.4% chlorine by weight and marketed by Hooker Chemical Corporation. "MBTS" denotes benzothiazyl disulfide and "Monex" is a commercial product containing tetramethylthiuram monosulfide.

The compositions were compounded in a conventional manner on a rubber mill. All compositions were cured with the following system:

| | |
|---|---|
| Zinc oxide | 5 pph |
| Stearic acid | 1 pph |
| MBTS | 2.1 pph |
| Monex | 0.4 pph |
| Sulfur | 2.5 pph |

Slab samples were compression molded for 30 minutes at 330° F. Moldings were cooled prior to removal from the press. Specimens were cut to size for testing.

| Polymer | Halogen Compound | pph | Metallic Compound | pph | Oxygen Index | ΔOI |
|---|---|---|---|---|---|---|
| (a) Rubber A | Halo-I | 17.6 | None | — | 22.5 | + 3.2 |
| (b) " | " | 17.6 | Antimony Trioxide | 10 | 25.9 | + 6.6 |
| (c) " | " | 17.6 | Ferrous Citrate | 5 | 31.4 | +12.1 |
| (d) " | Dechlorane 602 | 16.2 | Antimony Trioxide | 5 | 24.9 | + 5.6 |
| (e) " | " | 16.2 | Hydrated Ferrous Sulfate | 5 | 26.7 | + 7.4 |

The test data above reveal that the iron compounds augment the flame-retardant effect of the chlorine compounds more effectively than does antimony trioxide (it being noted also that an equal or lesser amount of the iron compound were used in relation to the amount of antimony trioxide).

The instant formulation can be converted to give a flame resistant sponge formulation by adding 50 to 300 pph of polyvinyl chloride, 25 to 100 pph of dioctyl phthalate plasticizer, 0 to 150 pph of filler such as calcium carbonate, and 10 to 40 pph of "Celogen AZ" blowing agent and curing for about 30 minutes at about 330° F. The resultant sponge has a density in the range of about 3 to 20 lbs. per cubic foot and exhibits different degrees of flame resistance up to "non-burning" category.

EXAMPLE 5

This Example demonstrates that the high effectiveness of the iron compound/halogen compound combinations in flame-retarding the polymer compositions is also manifested in horizontal burning tests. In the data listed below, the specimen used measured 5 inches × ½ inch × ⅛ inch, and NB denotes non-burning, i.e., the flame failed to reach the 1-inch starting line for burning rate determinations.

Polymer: ABS
Halogen Compound: Polyvinyl chloride*, 20 pph

| Iron Compound | pph | Oxygen Index | Horizontal Burning Rate (in./min.) |
|---|---|---|---|
| (a) None | — | 21.7 | 0.6 |
| (b) Ferric Sulfate | 6 | 29.6 | NB |
| (c) Ferrous Sulfate | 8 | 31.7 | '' |
| (d) Iron Metal | 9 | 33.0 | '' |
| (e) Basic Ferric Sulfate | 4.5 | 31.2 | '' |
| (f) Ferrous Oxalate | 4 | 30.7 | '' |
| (g) Ferric Ammonium Sulfate | 6 | 29.3 | '' |
| (h) Ferrous Ammonium Sulfate | 6 | 25.4 | '' |

*Stabilized with Thermolite 31.

EXAMPLE 6

This Example demonstrates that high levels of flame-retardancy in both oxygen index and vertical burning tests are achievable with iron compound/halogen compound, relative to antimony trioxide/halogen compound, combinations in NBR compositions. The test compositions were compounded and cured as in Example 4.

Polymer: Rubber A

| Halogen Compound | pph | Additive | pph | Oxygen Index | Vertical Burning Test[a] |
|---|---|---|---|---|---|
| (a) Dechlorane 602 | 32.4 | Antimony Trioxide | 10 | 28.0 | Fails[b] |
| (b) '' | 32.4 | Ferrous Citrate | 10 | 30.1 | 94V-0[c] |

[a]⅛" thick specimens.
[b]Each of 5 specimens continued to burn more than 30 seconds after first or second ignition.
[c]Each of 5 specimens extinguished in 5 seconds or less after each ignition.

An increase in the Dechlorane 602 content of (b) to 40 pph provided a composition with 94V-1 performance in the vertical burning test at a specimen thickness of one-sixteenth inch. Each of the five test specimens extinguished in 25 seconds or less after each of two ignitions.

EXAMPLE 7

This Example illustrates the greater effectiveness of the iron compounds as compared to compounds of other elements in flame-retarding a polymer composition containing a halogen compound. In the data listed below, NB is the same as identified in Example 5, SE denotes failure to burn to the 4-inch mark, and the data for stannic oxide hydrate as additive are excerpted from *J. Fire J Flammability* 3, 136 (1972).

Polymer: ABS resin
Halogen Compound: Polyvinyl chloride*, 20 pph

| Additive | pph | Oxygen Index | Horizontal Burning Rate (in/min) |
|---|---|---|---|
| (a) None | — | 21.7 | 0.6 |
| (b) Zinc Oxide | 10 | — | 1.3 |
| (c) Barium Metaborate | 10 | — | 0.9 |
| (d) Magnesium Oxide | 10 | — | 0.8 |
| (e) Cadmium Oxide | 10.1 | 21.3 | 0.8 |
| (f) Aluminum Oxide | 10 | — | 0.8 |
| (g) Lead Monoxide | 17.6 | 22.1 | 0.7 |
| (h) Zirconium Oxide | 10 | — | 0.6 |
| (i) Silica | 10 | — | 0.6 |
| (j) Boron Oxide | 10 | — | 0.6** |
| (k) Titanium Dioxide | 10 | — | 0.6** |
| (l) Tungsten Trioxide | 9.1 | 22.5 | 0.3** |
| (m) Bismuth Trioxide | 12.3 | 22.7 | 0.4** |
| (n) Cuprous Oxide | 11.3 | 22.4 | SE |
| (o) Chromic Oxide | 4.0 | 23.1 | SE |
| (p) Chromium Acetate | 6.5 | 21.5 | — |
| (q) Chromic Citrate | 7.8 | 21.1 | — |
| (r) Manganous Carbonate | 9.1 | 24.1 | — |
| (s) Arsenic Trioxide | 5.2 | 24.4 | NB |
| (t) Stannous Oxide | 10.6 | 24.5 | NB |
| (u) Stannic Oxide | 6 | 25.2 | NB |
| (v) Ferric Sulfate | 6 | 29.6 | NB |
| (w) Basic Ferric Sulfate | 4.5 | 31.2 | NB |
| (x) Ferrous Sulfate | 8 | 31.7 | NB |
| (y) Ferrous Oxalate | 4 | 30.7 | NB |
| (z) Ferric Ammonium Sulfate | 6 | 29.3 | NB |

Halogen Compound: Perchloropentacyclodecane, 25 pph

| (aa) Stannic Oxide Hydrate | 10 | 26.0 | — |

*Stabilized with Thermolite 31.
**Some specimens were either SE OR NB.

What is claimed is:
1. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in the form of hydroxyl, anhydride, ether, carboxyl, ester or phosphate groups and which are substantially non-volatile and stable at polymer processing temperatures, and mixtures thereof; and (b) from 0.1 to 50 parts by weight per 100 parts by weight of said organic polymer of an iron compound selected from the group consisting of basic and normal forms of ferrous and ferric sulfates, ferrous and ferric ammonium sulfates, iron carbonate, ferrous sulfide, ferrous, ferric, ferrous ammonium and ferric ammonium salts of aliphatic carboxylic acids which optionally contain a hydroxyl substituent, and iron resinate, and mixtures of said iron compounds.

2. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in the form of hydroxyl or anhydride groups and which are substantially non-volatile and stable at polymer processing temperatures, and mixtures thereof; and (b.) from 0.1 to 50 parts by weight per 100 parts by weight of said organic polymer of an iron compound selected from the group consisting of basic and normal forms of ferrous and ferric sulfates, ferrous and ferric ammonium sulfates, iron carbonate, ferrous sulfide, ferrous, ferric, ferrous ammonium and ferric ammonium salts of aliphatic carboxylic acids which optionally contain a hydroxyl substituent, and iron resinate, and mixtures of said iron compounds.

3. The composition of claim 2 in which said organic polymer is acrylonitrile-butadiene rubber.

4. The composition of claim 2 in which said organic polymer is a plastic graft terpolymer of acrylonitrile, butadiene and styrene.

5. The composition of claim 2 in which said organic additive is polyvinyl chloride.

6. The composition of claim 2 in which said organic additive is tetrabromobisphenol A.

7. The composition of claim 2 in which said organic additive is hexabromocyclodode 8. The composition of claim 2 in which said organic additive is 6-(1',4',5',6',7',7'-hexachloronorborn-5'-en-2'-yl)-1,2,3,4,10,10-hexachloro-1,4,4a,5,6,7,8,8a octahydro-1,4:5,8-dimethanonaphthalene.

9. The composition of claim 2 wherein said organic additive is 1,2,3,4,9,9-hexachloro-1,4,4a,5,6,7,8,8a-octahydro-1,4-methanonaphthalene-6,7-dicarboxylic anhydride.

10. The composition of claim 2 in which said organic additive is a cycloaliphatic chlorine compound.

11. The composition of claim 2 in which said iron compound is ferrous carbonate.

12. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in the form of hydroxyl or anhydride groups and which are substantially non-volatile and stable at polymer processing temperatures, and mixtures thereof; and (b) from 0.1 to 50 parts by weight per 100 parts by weight of said organic polymer of ferric sulfate.

13. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in the form of hydroxyl or anhydride groups and which are substantially non-volatile and stable at polymer processing temperatures, and mixtures thereof; and (b) from 0.1 to 50 parts by weight per 100 parts by weight of said organic polymer of basic ferric acetate.

14. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in the form of hydroxyl or anhydride groups and which are substantially non-volatile and stable at polymer processing temperatures, and mixtures thereof; and (b) from 0.1 to 50 parts by weight per 100 parts by weight of said organic polymer of ferrous sulfate.

15. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in the form of hydroxyl or anhydride groups and which are substantially non-volatile and stable at polymer processing temperatures, and mixtures thereof; and (b) from 0.1 to 50 parts by weight per 100 parts by weight of said organic polymer of ferrous citrate.

16. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in the form of hydroxyl or anhydride groups and which are substantially non-volatile and stable at polymer processing temperatures, and mixtures thereof; and (b) from 0.1 to 50 parts by weight per 100 parts by weight of said organic polymer of ferrous sulfide.

17. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in tne form of hydroxyl or anhydride groups and which are substantially non-volatile and stable at polymer processing temperatures, and mixtures thereof; and (b) from 0.1 to 50 parts by weight per 100 parts by weight of said organic polymer of ferrous oxalate.

18. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in the form of hydroxyl or anhydride groups and which are substantially non-volatile and stable at polymer processing temperatures, and mixtures thereof; and (b) from 0.1 to 50 parts by weight per 100 parts by weight of said organic polymer of ferric ammonium sulfate.

19. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in the form of hydroxyl or anhydride groups and which are substantially non-volatile and stable at polymer processing temperatures, and mixtures thereof; and (b) from 0.1 to 50 parts by weight per 100 parts by weight of said organic polymer of ferrous stearate.

20. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in the form of hydroxyl or anhydride groups and which are substantially non-volatile and stable at polymer processing temperatures, and mixtures thereof; and (b) from 0.1 to 150 parts by weight per 100 parts by weight of said organic polymer of ferric ammonium citrate.

21. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in the form of hydroxyl or anhydride groups and which are substantially non-volatile and stable at polymer processing temperatures, and mixtures thereof; and (b) from 0.1 to 50 parts by weight per 100 parts by weight of said organic polymer of basic ferric sulfate.

22. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in the form of hydroxyl or anhydride groups and which are substantially non-volatile and stable at polymer processing temperatures, and mixtures thereof; and (b) from 0.1 to 50 parts by weight per 100 parts by weight of said organic polymer of ferric oxalate.

23. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halgen content in the range of from 35 to 80 weight percent and optionally containing oxygen substituents in the form of hydroxyl or anhydride groups and which are substantially non-volatile and stable at polymer processing temperatures, and mixtures thereof; and (b) from 0.1 to 50 parts by weight per 100 parts by weight of said organic polymer of ferric ammonium oxalate.

24. A composition comprising an organic polymer selected from the group consisting of acrylonitrile-butadiene rubber and a plastic terpolymer of acrylonitrile, butadiene and styrene, and: (a) from 1 to 300 parts by weight per 100 parts by weight of said organic polymer of an organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in the form of hydroxyl or anhydride groups and which are substantially non-volatile and stable at polymer processing temperatures, and mixtures thereof; and (b) from 0.1 to 50 parts by weight per 100 parts by weight of said organic polymer of ferrous ammonium sulfate.

* * * * *

UNITED STATES PATENT OFFICE
CERTIFICATE OF CORRECTION

PATENT NO. : 3,951,894
DATED : April 20, 1976
INVENTOR(S) : William Paul Whelan, Jr.

It is certified that error appears in the above-identified patent and that said Letters Patent are hereby corrected as shown below:

Col. 11, line 37: cancel "hexabromocyclodode" and substitute --hexabromocyclododecane.-- therefor.

Col. 13, line 4: cancel "tne" and substitute --the-- therefor.

Col. 13, line 56: cancel "150" and substitute --50-- therefor.

Signed and Sealed this

Twenty-fourth Day of August 1976

[SEAL]

Attest:

RUTH C. MASON
Attesting Officer

C. MARSHALL DANN
Commissioner of Patents and Trademarks